United States Patent [19]

Schouten

[11] Patent Number: 5,224,684
[45] Date of Patent: Jul. 6, 1993

[54] BLOWBACK OPERATED FLUID VALVE

[75] Inventor: Herman A. Schouten, St. Paul, Minn.

[73] Assignee: Minnesota Mining and Manufacturing Company, St. Paul, Minn.

[21] Appl. No.: 872,498

[22] Filed: Apr. 23, 1992

[51] Int. Cl.$^5$ .............................................. F16K 31/12
[52] U.S. Cl. ............................ 251/30.05; 251/30.01; 251/129.04; 251/31
[58] Field of Search ................. 251/30.01, 31, 30.05, 251/129.04; 137/78.3

[56] References Cited

U.S. PATENT DOCUMENTS

| | | | |
|---|---|---|---|
| 746,337 | 12/1903 | Junggren | 251/30.05 |
| 2,775,982 | 1/1957 | Canfield | 251/30.05 |
| 3,372,306 | 3/1968 | Koizumi | 317/85 |
| 4,256,133 | 3/1981 | Coward et al. | 137/78.3 |
| 4,485,856 | 12/1984 | Dulian et al. | 141/198 |
| 4,556,261 | 12/1985 | Farr | 303/116 |
| 4,673,162 | 6/1987 | Lachmann | 251/30.05 |
| 4,682,628 | 7/1987 | Hill | 251/129.04 |
| 4,706,703 | 11/1987 | Takeuchi et al. | 137/487.5 |
| 4,794,948 | 1/1989 | Schempp | 251/129.15 |
| 5,031,258 | 7/1991 | Shaw | 251/129.04 |

FOREIGN PATENT DOCUMENTS

| | | |
|---|---|---|
| 2513737 | 10/1975 | Fed. Rep. of Germany . |
| 206439 | 1/1984 | Fed. Rep. of Germany . |
| 2557674 | 7/1985 | France . |
| 2585147 | 1/1987 | France . |
| 58-156292 | 9/1983 | Japan . |

Primary Examiner—A. Michael Chamber
Attorney, Agent, or Firm—Gary L. Griswold; Walter N. Kirn; Charles D. Levine

[57] ABSTRACT

A valve for controlling fluid flow is provided, which permits fluid flow through the valve upon a first exposure to incident light, and prevents fluid flow through the valve upon a second exposure to incident light. The valve includes inlet and outlet passageways that are adapted to divert a portion of the fluid away from a central passageway to shift a plunger between a first position and a second position. In the first position, the plunger permits fluid flow through the valve, and in the second position, the plunger prevents fluid flow through the valve.

16 Claims, 3 Drawing Sheets 5,224,684

BLOWBACK OPERATED FLUID VALVE

TECHNICAL FIELD

This invention relates to a valve for controlling fluid flow. More specifically, this invention relates to a valve that permits fluid flow through the valve upon a first exposure to incident light, and prevents fluid flow through the valve upon a second exposure to incident light.

BACKGROUND OF THE INVENTION

Valves to control fluid flow are well known and are used in a variety of situations, including the control of water, natural gas, air, gasoline, and other fluids. A typical valve construction includes a main passageway through which the fluid passes, and a structure for interfering with the flow of the fluid. Exemplary of standard fluid valves are the gate valve, the needle valve and the ball valve. A gate valve includes a gate that is raised and lowered responsive to an external input to slow or stop the passage of fluid through the valve. The needle valve includes a stem that is moved against and away from an annular seat, thereby obstructing or permitting fluid to pass through the valve. A ball valve includes an internal ball that has a longitudinal bore through which the fluid passes. When the ball is rotated in either direction, the bore becomes transverse to the direction of fluid flow, slowing or stopping the passage of fluid through the valve depending on the degree of rotation.

Many valves are manually operated, and they therefore require that an operator be present to control the action of the valve. Under some circumstances, it may be desirable to operate the valve using an automated process, or to operate the valve from a remote source. Thus a valve may be opened and closed by an externally supplied electric current. However, in some environments, such as one where flammable materials are present, an externally supplied electric current of sufficient magnitude may be unreasonably dangerous due to the possibility of sparking. It is therefore desirable to provide a self-contained fluid valve that is light activated, and produces a low-power electrical input, resulting in an intrinsically safe fluid valve. There is also a need for a valve that is opened and closed using the fluid that the valve controls to activate the valve.

SUMMARY OF THE INVENTION

According to the present invention, a valve is provided for controlling fluid flow. The valve includes a body having an upstream side and a downstream side, and a main passageway between said sides adapted for fluid flow therethrough. Also included is means for interfering with the fluid flow through said main passageway, which interfering means are adapted to shift between a first position which permits fluid flow through said main passageway and a second position which prevents fluid flow through said main passageway. The valve further includes blowback means for shifting the interfering means between the first and second positions. The blowback means is adapted to direct a portion of the fluid flow away from the main passageway in a first direction responsive to a first input to shift the interfering means from the first position to the second position to prevent fluid flow through the main passageway. The blowback means is also adapted to direct a portion of the fluid flow away from the main passageway in a second direction responsive to a second input to shift the interfering means from the second position to the first position to permit fluid flow through the main passageway.

In one embodiment of the valve, the interfering means includes a transverse passageway formed in the body and having first and second ends. The transverse passageway intersects the main passageway and communicates therewith. A plunger is slidably disposed within the transverse passageway and is adapted to shift between a first position and a second position. The first position permits fluid flow through the main passageway and the second position prevents fluid flow through the main passageway.

The blowback means includes inlet and outlet passageways each having first and second ends. The first end of the inlet passageway communicates with an upstream side of the main passageway and the second end communicates with the first end of the transverse passageway. The first end of the outlet passageway communicates with the downstream side of the main passageway, and the second end of the outlet passageway communicates with the second end of the transverse passageway. The inlet passageway has a gate for controlling fluid flow therethrough in the first direction responsive to the first input, and the outlet passageway has a gate for controlling fluid flow therethrough in the second direction responsive to the second input. In the preferred embodiment, the inputs are electrical inputs that are transmitted by a photoelectric power source and controlled by a photoelectric switch.

The present invention also provides an electrical circuit for controlling the flow of fluid through a valve. The circuit includes electrically activated means for interfering with the flow of fluid through the valve, means for providing electrical power, and circuitry electrically connecting the electrical power means and the interfering means. The electrical power means adapted to provide electrical power during exposure to incident light, and not to provide electrical power during nonexposure to incident light. Thus upon a first exposure to incident light, the electrical power means transmits a first electrical signal to enable the interfering means to prevent fluid flow through the valve, and upon a second exposure to incident light the electrical power means transmits a second electrical signal to enable the interfering means to permit fluid flow through the valve. In the preferred embodiment, the electrical power means comprises a photoelectric power source adapted to receive incident light and to transmit an electrical signal in response thereto.

DESCRIPTION OF THE DRAWINGS

The invention will be more readily understood with reference to the accompanying drawings, wherein like reference numerals refer to like components throughout the several views, and wherein.

DETAILED DESCRIPTION OF THE INVENTION

Figure 1:
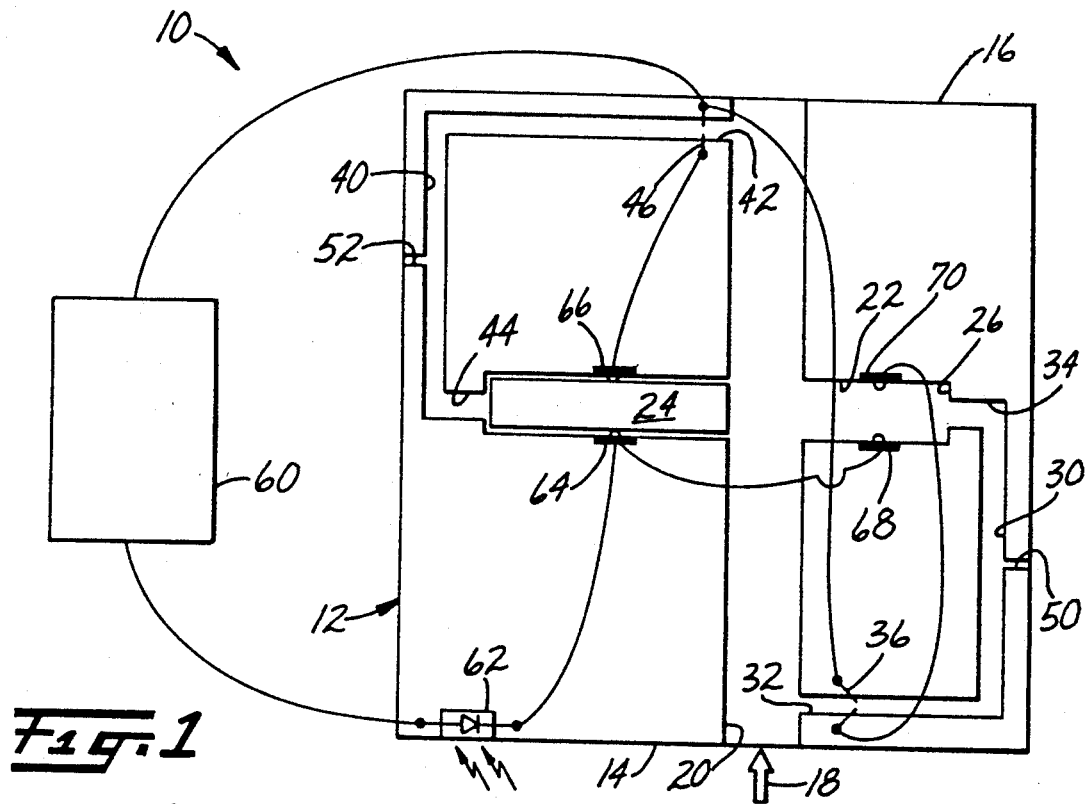
FIG. 1 is schematic representation of a fluid valve in an open position according to one embodiment of the present invention.
Figure 2:
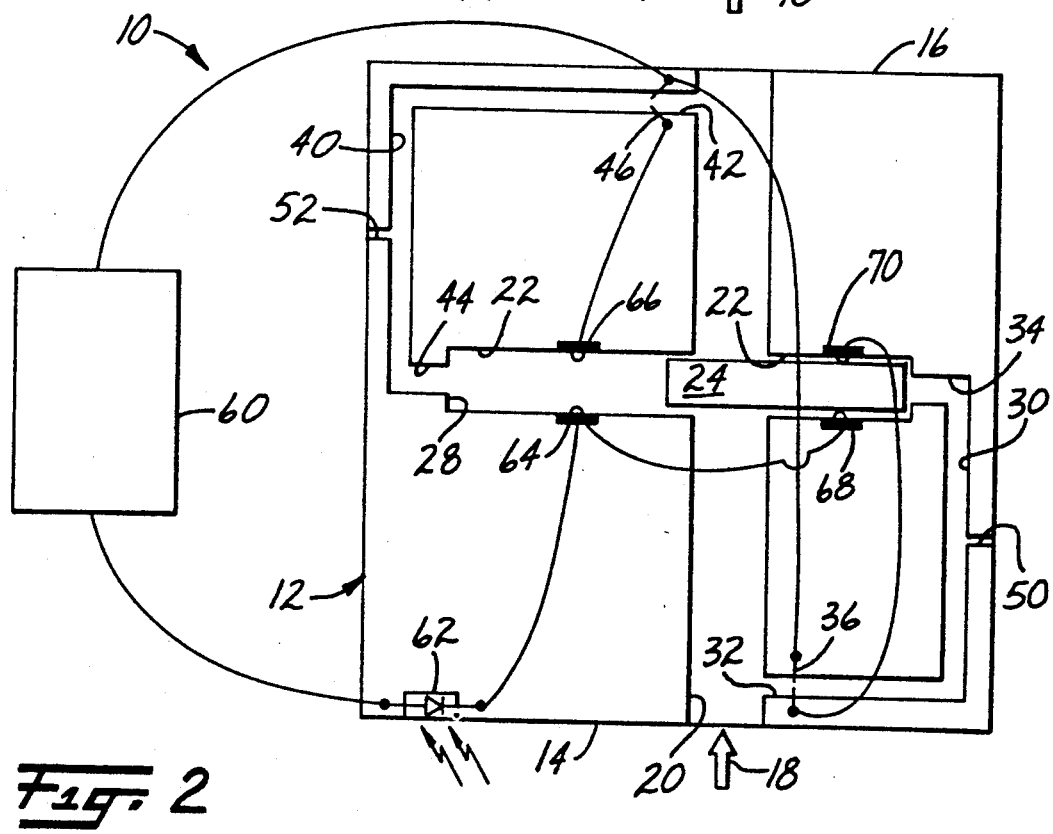
FIG. 2 is a schematic representation of the fluid valve of FIG. 1 in a closed position.

Referring to FIGS. 1 and 2, a valve 10 is shown for controlling fluid flow. "Fluid" shall be understood to include all gases and liquids, although the present invention is thought to have particular utility in controlling the flow of compressed air. Valve 10 includes a body 12 having an upstream side 14 and a downstream side 16 relative to a fluid flow direction 18. Body 10 further includes a main passageway 20 which connects upstream side 14 and downstream side 16 to permit fluid flow through valve 10 between the two sides.

Figure 3:
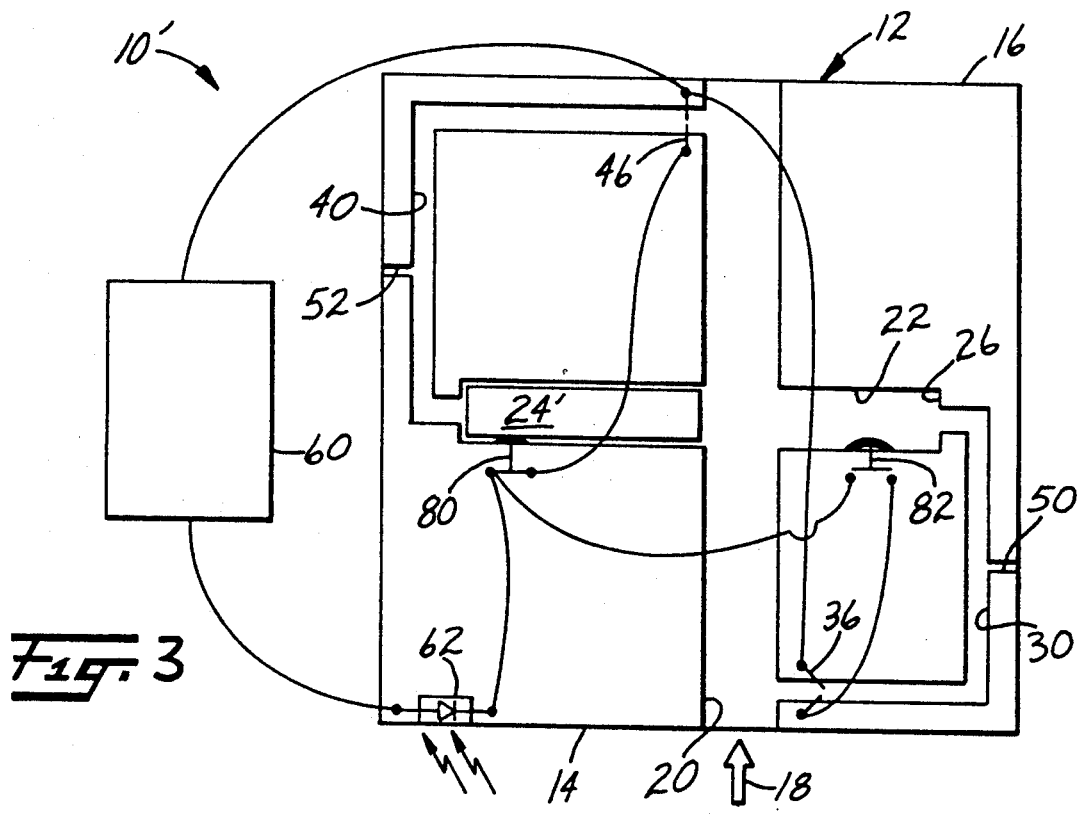
FIG. 3 is schematic representation of a fluid valve in an open position according to a second embodiment of the present invention.
Figure 4:
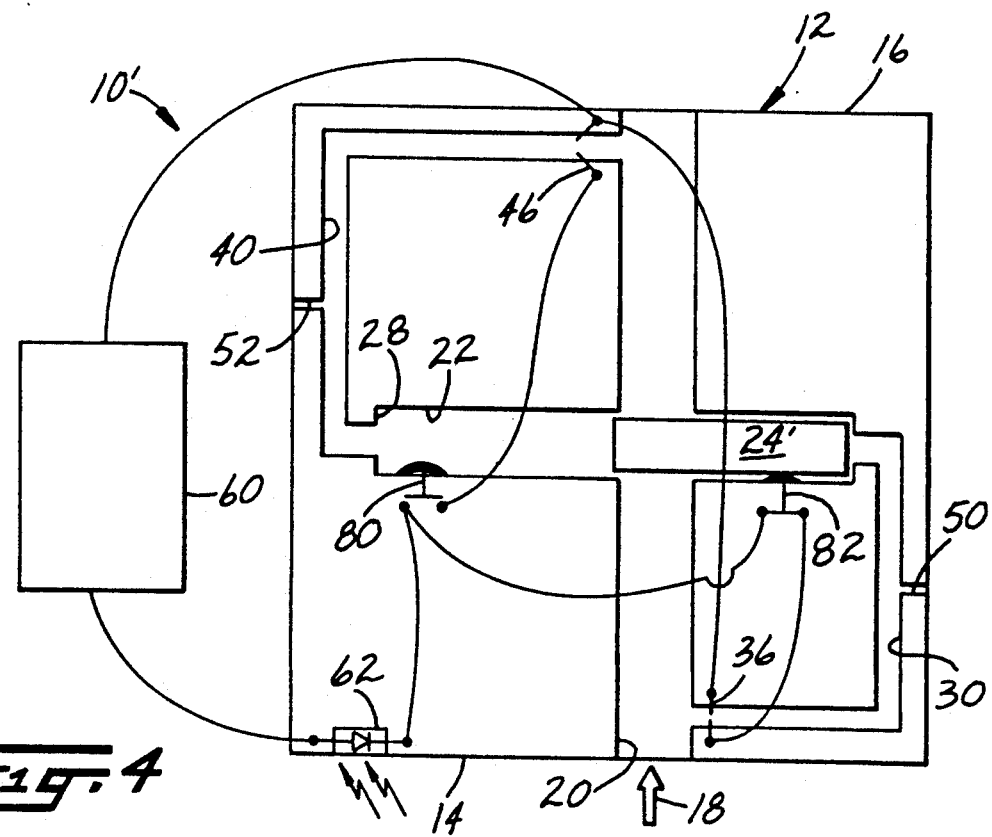
FIG. 4 is a schematic representation of the fluid valve of FIG. 3 in a closed position.

Means is provided for interfering with the fluid flow through main passageway 20. The interfering means is adapted to shift between a first state, which permits fluid flow through the main passageway, and a second state, which prevents fluid flow through the main passageway. In the illustrated embodiment, the interfering means comprises a transverse passageway 22, which intersects and communicates with main passageway 20, and a plunger 24. Transverse passageway 22 includes a first end 26 and a second end 28, and is shown as generally perpendicular to main passageway 20, although other orientations are contemplated Plunger 24 can slide within transverse passageway 22, and is adapted to shift between a first position, as shown in FIGS. 1 and 3, and a second position, as shown in FIGS. 2 and 4. Interfering means could comprise other known structures, including a rotatable member having a transverse bore (and operating in the general manner of a ball valve) but transverse passageway 22 and plunger 24 will be referred to throughout as representative interfering means.

Blowback means is provided for shifting plunger 24 between the first and second positions. Generally, blowback means comprises an inlet passageway and an outlet passageway, each of which is adapted to direct a portion of the fluid flow away from said main passageway to shift plunger 24 between the first and second positions an response to an input. In the broadest sense of the invention, the input could be manual, pneumatic, hydraulic or otherwise, but in the preferred embodiment, the input is electrical, as described below.

In the preferred embodiment, the valve of the present invention is activated in response to successive inputs of incident light. A first exposure to incident light generates a first electrical signal that lasts as long as the exposure to light continues, as will be described further below. A second exposure to incident light generates a second electrical signal that lasts as long as the second exposure to light continues In continued operation, the valve is thus activated in response to paired exposures to incident light, which generate paired (first and second) electrical signals Succeeding paired exposures to incident light will again generate paired (first and second) electrical signals, causing the valve to repeat the same series of operations.

In the illustrated embodiment, inlet passageway 30 includes a first end 32 and a second end 34, as well as a source gate 36 within inlet passageway 30 to control fluid flow therethrough. First end 32 communicates with an upstream side of main passageway 20, and second end 34 communicates with first end 26 of transverse passageway 22. Source gate 36 is preferably located adjacent main passageway 20, as shown in FIGS. 1 through 4, but could instead be located elsewhere within inlet passageway 30.

Source gate 36 is activated in response to an input, and acts as a valve within inlet passageway 30. In the preferred embodiment, source gate 36 is adapted to open responsive to a first electrical signal of a pair of such signals, and to remain open during the duration of the first electrical signal. At the termination of the first electrical signal, source gate 36 closes, and remains closed throughout the duration of a second electrical signal, until it opens responsive to the onset of a first electrical signal of a succeeding pair of electrical signals. Thus, fluid is permitted to flow through inlet passageway 30 during a first electrical signal of a pair of such signals, but is prevented from flowing through inlet passageway 30 between the termination of a first electrical signal and the onset of a first electrical signal of a succeeding pair of such signals.

Outlet passageway 40 includes a first end 42 and a second end 44, as well as a load gate 46 within outlet passageway 40 to control fluid flow therethrough First end 42 communicates with a downstream side of main passageway 20, and second end 44 communicates with second end 28 of transverse passageway 22. Load gate 46 is preferably located adjacent main passageway 20, as shown in FIGS. 1 through 4, but could instead be located elsewhere within outlet passageway 40.

Load gate 46 is similar to source gate 36, in that it is activated responsive to an input, and it acts as a valve within outlet passageway 40. In the preferred embodiment, load gate 46 is adapted to open responsive to a second electrical signal of the pair of electrical signals, and to remain open until the termination of the second electrical signal. At the termination of the second electrical signal, load gate 46 closes, and remains closed throughout the duration of a second electrical signal of a pair of electrical signals, until it opens responsive to the onset of a first electrical signal of a succeeding pair of electrical signals. Thus fluid is permitted to flow through outlet passageway 40 during a second electrical signal of a pair of such signals, but is prevented from flowing through outlet passageway 40 between the termination of the second electrical signal and the onset of a second electrical signal of a succeeding pair of signals.

Depending on the valve construction, pressure relief check valves 50 and 52 may be required to bleed away any accumulated fluid that would tend to inhibit the motion of plunger 24 into the second and first positions respectively. For example, when plunger 24 is in the first position and is being urged toward the second position, fluid remaining within inlet passageway may inhibit the plunger from shifting to the second position, and thus pressure relief check valve 50 would bleed away such fluid to facilitate shifting of the plunger The check valve feature allows fluid to exit the valve, but not to enter the valve. The fluid may be bled into the environment, if the fluid is not harmful (e.g. compressed air, or water) or returned to the fluid stream by any known means.

Electrical circuitry is provided, and includes means for providing electrical power. In the preferred embodiment, the electrical power means is adapted to provide electrical power during exposure to incident light, and not to provide electrical power during nonexposure to incident light. Alternatively, the electrical power means could be adapted to provide electrical power during nonexposure to incident light, and not to provide power during exposure to incident light. In the illustrated embodiment, the electrical power means comprises a photoelectric power source 60, which is adapted to receive incident light and to transmit an electrical signal responsive thereto. Incident light may comprise low-intensity ambient light, or a high-intensity, concentrated beam of light, depending on the characteristics of photoelectric power source 60.

Circuitry is provided to electrically connect photoelectric power source 60 and the blowback means described above, and thus when photoelectric power source 60 is exposed to a first input of incident light, a first electric signal is transmitted to blowback means. The first signal lasts until the exposure to incident light ends, and the photoelectric power source can no longer transmit the first electrical signal. Similarly, a second exposure to incident light enables photoelectric power source 60 to transmit a second electrical signal to the blowback means. This signal lasts until the exposure to incident light ends and photoelectric power source 60 can no longer transmit the second electrical signal.

As shown in FIGS. 1 through 4, electrical power means may also comprise a photoelectric switch 62 electrically connected to photoelectric power source 60. Photoelectric switch 62 is adapted to close during exposure of said switch to incident light, and to open during nonexposure to incident light. Photoelectric switch 62 could include a material such a selenium, which may be adapted to conduct electricity when exposed to incident light. Photoelectric switch 62 could be used in conjunction with photoelectric power source 60, as illustrated, or with a conventional power source (such as 120 volt current), in order to transmit the electrical signals in response to successive inputs of incident light. With suitable modifications, the present invention may have utility when powered by incident light as described above, as well as with conventional power sources such as household electrical current, or a battery.

In the most preferred embodiment, photoelectric switch 62 is adapted to close upon exposure to a concentrated, high energy source of incident light, such as a laser diode, or a light emitting diode (LED). After the photoelectric switch is closed, the photoelectric power source 60, which is powered by ambient light, transmits power to the remainder of the valve. This embodiment enables the area surrounding the valve to be lighted (in order to power the photoelectric power source), while enabling the valve to be activated by concentrated exposure to light from a source remote from the valve.

FIGS. 1 and 2 illustrate one method of electrically connecting the described components in concert with a conductive (e.g. aluminum) plunger 24. In FIG. 1, valve 10 is shown in steady state before any exposure to incident light, and thus source gate 36 is open and load gate 46 is closed. Contact pads 64 and 66 contact plunger 24 when the plunger is in the first position, as shown in FIG. 1, and contact pads 68 and 70 contact plunger 24 when the plunger is in the second position, as shown in FIG. 2. When photoelectric switch 62 is exposed to a first input of incident light, it transmits an electrical signal from photoelectric power source 60 to contact pad 64, through conductive plunger 24, to contact pad 66, and to load gate 46 and source gate 36. Load gate 46 opens, allowing fluid to flow through outlet passageway 40 and against plunger 24, urging it toward the second position. Source gate 36 closes, preventing fluid from flowing through inlet passageway 30. The force of the fluid in outlet passageway 40 against plunger 24 tends to urge plunger 24 into the second position, as illustrated in FIG. 2, which prevents fluid flow through main passageway 20.

Valve 10 is closed in FIG. 2, and is in steady state following the termination of the first input of incident light. When the second input o incident light strikes photoelectric switch 62, a second electrical signal is transmitted through contact pad 68, plunger 24, and contact pad 70 to load gate 46 and to source gate 36. Load gate 46 closes, preventing fluid from flowing through outlet passageway 40, and source gate 36 opens, allowing fluid to flow through inlet passageway 30. In a manner similar to that described above, the force of the fluid flowing into inlet passageway 30 urges plunger 24 from the second position toward the first position, allowing fluid to flow through main passageway 20. Valve 10 is open.

The electric circuit changes slightly when a non-conductive plunger 24' is used, as shown in FIGS. 3 and 4. Valve 10' includes substantially all the elements of valve 10 shown in FIGS. 1 and 2, including main passageway 20 for fluid flowing in direction 18, inlet passageway 30, outlet passageway 40, source gate 36 and load gate 46. Contact switch 80 is adapted to close when plunger 24' is in the first position (FIG. 3), and to open when plunger 24' is in the second position (FIG. 4). Similarly, contact switch 82 is adapted to close when plunger 24' is in the second position (FIG. 4), and to open when plunger 24' is in the first position (FIG. 3). Electrical circuitry such as that shown is adapted to conduct electricity from photoelectric power source 60 through photoelectric switch 62 to interfering means described above. The remainder of the operation of the valve is as discussed above with reference to conductive plunger 24, and will not be recounted herein.

Figure 5:
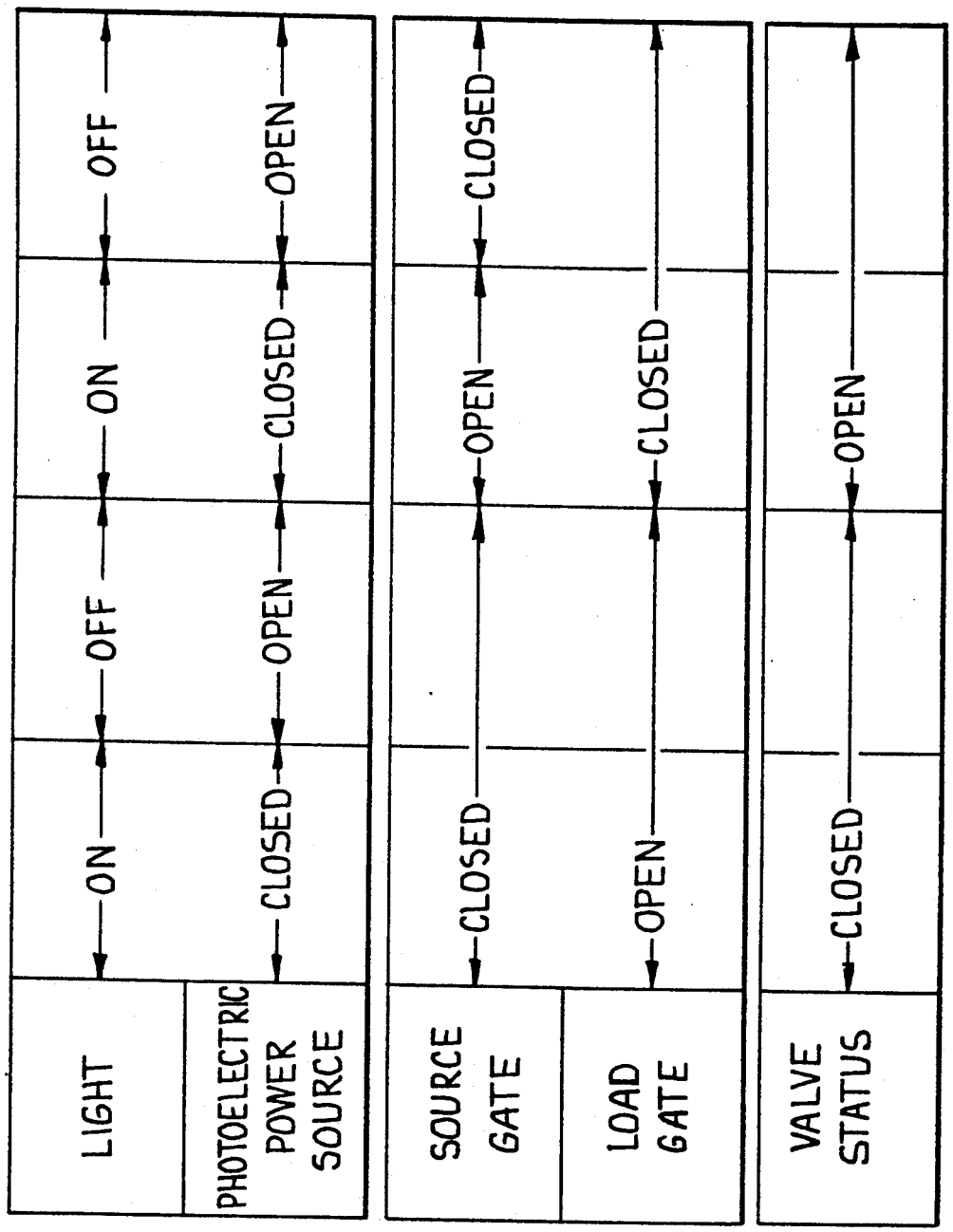
FIG. 5 is a graphical representation of the status of different portions of the valve in response to successive inputs of incident light.

The chart of FIG. 5 is a graphical representation of the status of different portions of the valve in response to successive inputs of incident light. The valve is open prior to the first exposure to incident light. When the photoelectric power source is first exposed to incident light, the power source (and photoelectric switch, if present) closes, and conducts electricity to the remainder of the valve. Source gate 36 remains closed, and load gate 46 opens. The fluid flow through outlet passageway 40 urges plunger 24 into the second position, and the valve is closed.

When the exposure of light to the valve is stopped, photoelectric power source 60 is open, and electricity ceases to flow to the remainder of the valve. Source gate 36 remains closed, and load gate 46 closes in response to the termination of the first electrical signal. The valve remains closed.

Upon a second exposure of photoelectric power source 60 to incident light, the power source is again closed and conducts electricity to the remainder of the valve. Source gate 36 opens in response to the initiation of the second electrical signal, and load gate 46 remains closed. The fluid flow through inlet passageway 30 urges plunger 24 into the first position, and the valve is open.

When the second exposure of the valve to incident light is stopped, photoelectric power source 60 is open, and electricity ceases to flow to the remainder of the valve. Source gate 36 closes in response to the termination of the second electrical signal, and load gate 46 remains closed. The valve remains open.

The present invention has been described with reference to several embodiments thereof. It will be apparent to those skilled in the art that many changes can be made in the embodiments described without departing from the scope of the invention. For example, the blowback means of the present invention may be incorporated into other types of fluid valves. The photoelectric power source could be replaced with a standard electrical supply, and the valve could operate responsive to other than incident light. Thus, the scope of the present invention should not be limited to the structures described herein, but only by structures described by the language of the claims and the equivalents of those structures.

I claim:

1. A valve for controlling fluid flow, comprising:
   (a) a body having an upstream side and a downstream side, and a main passageway between said sides adapted for fluid flow therethrough;
   (b) means for interfering with the fluid flow through said main passageway, said interfering means adapted to shift between a first state which permits fluid flow through said main passageway and a second state which prevents fluid flow through said main passageway, wherein said interfering means comprises opposing first and second working sides oriented substantially perpendicular to the fluid flow direction through said main passageway;
   (c) blowback means for shifting said interfering means between said first and second states, said blowback means adapted to direct a portion of the fluid flow away from said main passageway in a first direction responsive to a first input to contact said first working side of said interfering means and to apply substantial force only in said first direction to shift said interfering means from said first state to said second state to prevent fluid flow through said main passageway, and in a second direction responsive to a second input to contact said second working side of said interfering means and to apply substantial force only in said second direction to shift said interfering means from said second state to said first state to permit fluid flow through said main passageway.

2. The valve of claim 1, wherein said interfering means comprises a transverse passageway formed in said body and having first and second ends, said transverse passageway intersecting said main passageway, and a plunger slidably disposed within said transverse passageway and adapted to shift between a first position and a second position, wherein said opposing first and second working sides are formed on said plunger, wherein in said first position said plunger permits fluid flow through said main passageway and in said second position said plunger prevents fluid flow through said main passageway.

3. The valve of claim 2, wherein said blowback means comprises inlet and outlet passageways each having first and second ends, said first end of said inlet passageway communicating with an upstream side of said main passageway and said second end communicating with said first end of said transverse passageway, said first end of said outlet passageway communicating with said downstream side of said main passageway, and said second end of said outlet passageway communicating with said second end of said transverse passageway, said inlet passageway having means for controlling fluid flow therethrough in said first direction responsive to said first input, and said outlet passageway having means for controlling fluid flow therethrough in said second direction responsive to said second input.

4. The valve of claim 1, wherein said first and second inputs comprise electrical inputs.

5. The valve of claim 1, wherein said electrical inputs are transmitted by a photoelectric power source and controlled by a photoelectric switch.

6. The valve of claim 2, wherein the opposing first and second working sides have equal surface areas.

7. A valve for controlling fluid flow, comprising:
   (a) a body having an upstream side and a downstream side, and a main passageway between said sides adapted for fluid flow therethrough;
   (b) means for interfering with the fluid flow through said main passageway, said interfering means adapted to shift from a first position which permits fluid flow through said main passageway to a second position which prevents fluid flow through said main passageway, wherein said interfering means comprises opposing first and second working sides oriented substantially perpendicular to the fluid flow direction through said main passageway;
   (c) electrically activated blowback means for shifting said interfering means between said first and second positions, said blowback means comprising an inlet passageway and an outlet passageway, and adapted to direct a portion of the fluid flow away from said main passageway through said outlet passageway to contact said first working side of the interfering means and to apply substantial force only on said first working side to shift said interfering means from said first position to said second position to prevent fluid flow through said main passageway responsive to a first electrical signal, and away from said main passageway through said inlet passageway to contact said second working side of the interfering means and to apply substantial force only on said second working side to shift said interfering means from said second position to said first position to permit fluid flow through said main passageway responsive to a second electrical signal; and
   (d) an electrical circuit including
      (i) means for providing electrical power, said means adapted to provide electrical power during exposure of said means to incident light, and not to provide electrical power during nonexposure to incident light; and
      (ii) circuitry electrically connecting said electrical power means and said blowback means;
   whereby upon a first exposure to incident light said electrical power means transmits said first electrical signal to said blowback means, and upon a second exposure to incident light said electrical power means transmits said second electrical signal to said blowback means.

8. The valve of claim 7, wherein said electrical power means comprises a photoelectric power source adapted to receive incident light and to transmit an electrical signal responsive thereto.

9. The valve of claim 8, wherein said electrical power means further comprises a photoelectric switch electrically connected to said photoelectric power source and adapted to close during exposure of said switch to incident light, and to open during nonexposure to incident light.

10. The valve of claim 7, wherein said interfering means comprises:
(a) a transverse passageway intersecting said main passageway, said transverse passageway having first and second ends, and
(b) a plunger slidably disposed within said transverse passageway and adapted to shift between a first position and a second position, wherein said opposing first and second working sides are formed on said plunger, and wherein said first position permits fluid flow and said second position prevents fluid flow through said main passageway.

11. The valve of claim 7, wherein said inlet passageway comprises first an second ends, said first end communicating with an upstream side of said main passageway and said second end communicating with said first end of said transverse passageway, said inlet passageway further comprising an electrically activated gate in said inlet passageway, said gate adapted to permit fluid flow through said inlet passageway during a first electrical signal of a pair of electrical signals, and adapted to prevent fluid flow through said inlet passageway until a first electrical signal of a subsequent pair of electrical signals, and wherein said outlet passageway comprises first and second ends, said first end communicating with a downstream side of said main passageway and said second end communicating with said second end of said transverse passageway, said outlet passageway further comprising an electrically activated gate in said outlet passageway, said gate adapted to prevent fluid flow through said outlet passageway during a second electrical signal of a pair of electrical signals, and adapted to permit fluid flow through said outlet passageway until said first electrical signal of said subsequent pair of electrical signals.

12. An electrical circuit for controlling the flow of fluid through an intrinsically safe fluid valve which is used in locations in which flammable materials are present, the circuit comprising:
(a) electrically activated means for interfering with the flow of fluid through the valve;
(b) low energy means for providing electrical power, said means adapted to provide electrical power during exposure of said means to incident light, and not to provide electrical power during nonexposure to incident light; and
(c) circuitry electrically connecting said electrical power means and said interfering means;
whereby upon a first exposure to incident light said electrical power means transmits a first electrical signal to enable said interfering means to prevent fluid flow through the valve, and whereby upon a second exposure to incident light said electrical power means transmits a second electrical signal to enable said interfering means to permit fluid flow through the valve.

13. The electrical circuit of claim 12, wherein said electrical power means comprises a photoelectric power source adapted to receive incident light and to transmit an electrical signal in response thereto.

14. The electrical circuit of claim 12, wherein said electrical power means further comprises a photoelectric switch electrically connected to said photoelectric power source and adapted to close during exposure of said switch to incident light, and to open during nonexposure to incident light.

15. The electrical system of claim 14, wherein said photoelectric switch comprises a conductor including selenium.

16. A valve for controlling fluid flow, comprising:
(a) a body having an upstream side and a downstream side, and a main passageway between said sides adapted for fluid flow therethrough;
(b) means for interfering with the fluid flow through said main passageway, said interfering means adapted to shift between a first position which permits fluid flow through said main passageway and a second position which prevents fluid flow through said main passageway, and said interfering means comprises opposing first and second working sides oriented substantially perpendicular to the fluid flow direction through said main passageway;
(c) electrically activated blowback means for shifting said interfering means between said first and second positions, said blowback means comprising an inlet passageway and an outlet passageway, and adapted to direct a portion of the fluid flow away from said main passageway through said outlet passageway to contact the first working side of the interfering means and to apply substantial force only on said first working side to shift said interfering means from said first position to said second position to prevent fluid flow through said main passageway responsive to a first electrical signal, and away from said main passageway through said inlet passageway to contact said second working side of the interfering means and to apply substantial force only on said second working side to shift said interfering means from said second position to said first position to permit fluid flow through said main passageway responsive to a second electrical signal; and
(d) an electrical circuit including
(i) means for providing electrical power, said means adapted to provide electrical power during exposure of said means to incident light, and not to provide electrical power during nonexposure to incident light; and
(ii) circuitry electrically connecting said electrical power means and sad blowback means;
whereby upon a first nonexposure to incident light said electrical power means transmits said first electrical signal to said blowback means, and upon a second nonexposure to incident light said electrical power means transmits said second electrical signal to said blowback means.

* * * * *

UNITED STATES PATENT AND TRADEMARK OFFICE
CERTIFICATE OF CORRECTION

PATENT NO. : 5,224,684
DATED : Jul. 6, 1993
INVENTOR(S) : Schouten

It is certified that error appears in the above-indentified patent and that said Letters Patent is hereby corrected as shown below:

Cover page, column 1, line 32, delete "251/129.15"
and insert --137/554--.

Cover page, column 2, line 11 delete "Chamber"
and insert --Chambers--.

Column 3, line 28, delete "contemplated Plunger"
and insert --contemplated. Plunger--.

Column 3, line 44, delete "tions an response"
and insert --tions in response--.

Column 3, line 58, delete "signals Succeeding"
and insert --signals. Succeeding--

Column 4, line 22, delete "therethrough First"
and insert --therethrough. First--

Column 4, line 56, delete "plunger The"
and insert --plunger. The--

UNITED STATES PATENT AND TRADEMARK OFFICE
CERTIFICATE OF CORRECTION

PATENT NO. : 5,224,684
DATED : Jul. 6, 1993
INVENTOR(S) : Schouten

It is certified that error appears in the above-indentified patent and that said Letters Patent is hereby corrected as shown below:

Column 6, line 8, delete "input o incident"
   and insert --input of incident--.

Column 10, line 52, delete "sad"
   and insert --said--.

Signed and Sealed this

Twenty-fifth Day of October, 1994

Attest:

BRUCE LEHMAN

Attesting Officer     Commissioner of Patents and Trademarks